(12) United States Patent
Yoshida et al.

(10) Patent No.: US 6,635,695 B2
(45) Date of Patent: Oct. 21, 2003

(54) ADHESIVE COMPOSITION FOR LIGNOCELLULOSE-TYPE HOT-PRESSED FORMS, AND HOT-PRESSED FORM PRODUCTION PROCESS USING THE SAME

(75) Inventors: Mitsuhiro Yoshida, Oiso-machi (JP); Seiki Suzuki, Yokohama (JP); Tadashi Kimura, Yokohama (JP); Masashi Kanaya, Yokohama (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 255 days.

(21) Appl. No.: 09/826,721

(22) Filed: Apr. 5, 2001

(65) Prior Publication Data

US 2002/0143085 A1 Oct. 3, 2002

(30) Foreign Application Priority Data

Jan. 31, 2001 (JP) ........................................ 2001-023168

(51) Int. Cl.⁷ .......................... C08L 97/02; C08L 91/08; C08L 1/02
(52) U.S. Cl. ............................ 524/13; 524/14; 524/487; 524/489
(58) Field of Search ................................ 524/487, 489, 524/13, 14; 156/330.9, 331.1, 331.4, 331.7, 335, 228, 289; 428/355 N, 355 AK, 541; 264/109, 122

(56) References Cited

U.S. PATENT DOCUMENTS

| 4,110,397 A | 8/1978 | Wooler ........................ 264/338 |
| 4,388,138 A | 6/1983 | Brown et al. ................ 156/289 |
| 4,396,673 A | 8/1983 | Ball et al. ................... 428/326 |
| 4,810,202 A | 3/1989 | Nodfelt ....................... 439/289 |

FOREIGN PATENT DOCUMENTS

EP  460 858  12/1991

*Primary Examiner*—Peter Szekely
(74) *Attorney, Agent, or Firm*—Fish & Richardson P.C.

(57) ABSTRACT

An adhesive composition for lignocellulose-type hot-pressed forms is disclosed which comprises (A) an organopolyisocyanate which is a polyisocyanate composed chiefly of from 20% by weight to 70% by weight of a diphenylmethane diisocyanate having two benzene rings in one molecule and from 80% by weight to 30% by weight of a diphenylmethane diisocyanate polynuclear condensate having at least three benzene rings in one molecule, and has a viscosity of 500 mPa·s or less in the state of solid content=100% by weight at 25° C.; and (B) a wax emulsion prepared by emulsifying a wax (B1) which is a paraffin wax containing at least 80% by weight of a paraffin having 20 to 40 carbon atoms, and has a melting point of from 40° C. to 100° C., with an emulsifier (B2) which is an ethylene oxide polyaddition product of an aliphatic monoalcohol whose aliphatic chain has 14 to 20 carbon atoms. Also disclosed is a process for producing lignocellulose-type hot-pressed forms, using this adhesive composition. The adhesive composition has a good releasability from heating platens used in hot-press forming.

9 Claims, No Drawings

ADHESIVE COMPOSITION FOR LIGNOCELLULOSE-TYPE HOT-PRESSED FORMS, AND HOT-PRESSED FORM PRODUCTION PROCESS USING THE SAME

BACKGROUND OF THE INVENTION

1. Field of the Invention

This invention relates to an adhesive composition for lignocellulose-type hot-pressed forms (hot-pressing formed articles) which is comprised of an organopolyisocyanate and a wax emulsion, and also relates to a process for producing hot-pressed forms by using such a composition. More particularly, this invention relates, in the manufacture of hot-pressed forms making use of lignocellulose materials, to an adhesive composition having superior performances on releasability and resistance to hot water, and a process for producing hot-pressed forms by using such a composition.

2. Related Background Art

As adhesives for hot-pressed forms (boards such as particle boards and medium-density fiber boards) of lignocellulose materials such as wood chips and wood fibers, formalin-type adhesives of urea resin, melamine resin, urea melamine resin, phenolic resin or phenolic melamine resin have conventionally been used. However, as is seen in recent problems of, e.g., the sick building syndrome, it has become necessary to reduce formalin released from adhesives. As adhesives that can cope with such a problem to improve living environment, organopolyisocyanate resins have been put into use as non-formalin type adhesives because of their excellent adhesive properties such as resistance to heat and water, in addition to the feature that they do not contain any formalin originally in their structure. When, however, the organopolyisocyanate resins are used as adhesives for the above hot-pressed forms, a phenomenon may occur such that the formed material adheres strongly to the metal surface coming into contact therewith (hereinafter "heating platen") at the time of hot-press forming by means of a continuous or batch-wise press, bringing about a problem that the hot-pressed forms can not stably continuously be produced.

To solve this problem of adhesion to the heating platen, a method is proposed as disclosed in Japanese Patent Application Laid-open No. 52-154875 in which a release agent (hereinafter "external release agent") is directly applied on the heating platen before hot pressing. Meanwhile, not such an external release agent coating method but a method in which an additive (hereinafter "internal release agent") is mixed in an organopolyisocyanate is proposed as disclosed in Japanese Patent Applications Laid-open No. 59-205175, No. 57-113053 and No. 1-198572. Japanese Patent Application Laid-open No. 4-232004 proposes a method in which a lignocellulose material is hot-press formed with addition of an orthophosphoric acid neutral ester as a compatibilizer of an emulsion wax with an organopolyisocyanate. In this method, however, any wax/orthophosphoric acid neutral ester mixture can not be obtained in a liquid form which is easy to handle at normal temperature, leaving a problem in the handling of the emulsion wax.

In the method using an external release agent, it is necessary to appropriately coat the heating platen with the external release agent in order to ensure releasability continuously, and there is such a problem that its coating is difficult and troublesome to operate. With the method using an internal release agent, it is necessary to use the internal release agent in a large quantity in order for the agent to exhibit the sufficient effect of releasing, causing such adverse effects that because of its use in a large quantity the physical properties deteriorate, and also, in an actual production process, involving difficulties in respect of long-time durability and also in respect of economical advantages. Thus, this method has not been applied in any existing manufacturing processes.

SUMMARY OF THE INVENTION

As a result of extensive studies, the present inventors have discovered that an adhesive composition comprised of an organopolyisocyanate compound and a wax emulsion having a specific formulation can solve the above various problems, as an adhesive composition for hot-pressed forms of lignocellulose materials. Thus, they have accomplished the present invention.

More specifically, the present invention provides an adhesive composition for lignocellulose-type hot-pressed forms which comprises;

(A) an organopolyisocyanate which is a polyisocyanate composed chiefly of from 20 to 70% by weight of a diphenylmethane diisocyanate having two benzene rings in one molecule and from 80 to 30% by weight of a diphenylmethane diisocyanate polynuclear condensate having at least three benzene rings in one molecule, and has a viscosity of 500 mPa·s or less in a state of solid content=100% by weight at 25° C.; and (B) a wax emulsion prepared by emulsifying a wax (B1) which is a paraffin wax containing at least 80% by weight of a paraffin having 20 to 40 carbon atoms, and has a melting point of from 40° C. to 100° C., with an emulsifier (B2) which is an ethylene oxide polyaddition product of an aliphatic monoalcohol whose aliphatic chain has 14 to 20 carbon atoms.

In the above adhesive composition, the paraffin wax (B1) may have a molecular weight of from 100 to 1,200 in its molecular weight distribution measured by gel permeation chromatography and as molecular weight in terms of polyoxypropylene glycol as a reference substance.

In the above adhesive composition, the emulsifier (B2) may have a number-average molecular weight of from 250 to 3,000.

The adhesive composition may further contain (C) a formalin condensation resin.

The present invention also provides a process for producing lignocellulose-type hot-pressed forms, characterized by using the adhesive composition described above.

DESCRIPTION OF THE PREFERRED EMBODIMENTS

The adhesive composition of the present invention will be described below concerning its components.

The adhesive composition of the present invention is composed basically of (A) an organopolyisocyanate and (B) a wax emulsion.

(A) Organopolyisocyanate

The component-(A) organopolyisocyanate used in the present invention may preferably be of a type having a good compatibility with the component-(B) wax emulsion described later. Taking account of mixing performance of individual adhesive components and operability required when the composition is applied on lignocellulose materials, the organopolyisocyanate may preferably be those having a viscosity at 25° C. of 500 mPa·s or less, and particularly preferably from 10 to 400 mPa·s. The component-(A) organopolyisocyanate may also preferably have an isocyanate content of from 20 to 35% by weight, and particularly preferably from 28 to 32% by weight.

Since in this way the organopolyisocyanate is required to have a low viscosity and a high isocyanate content, a solvent and a plasticizer may be added thereto, but preferably none of them be added and the organopolyisocyanate may preferably have a viscosity of 400 mPa·s.

The component-(A) organopolyisocyanate is composed chiefly of a mixture of a diphenylmethane diisocyanate having two benzene rings in one molecule (hereinafter "MDI") and a diphenylmethane diisocyanate polynuclear condensate having at least three benzene rings in one molecule. Hereinafter, the said mixture is referred to as "polymeric MDI". In the organopolyisocyanate, the MDI or polymeric MDI account for 50% by weight or more, and other isocyanates may further be added thereto.

As will be detailed later, the component-(A) organopolyisocyanate usable in the present invention may be a prepolymer terminated with isocyanate groups, obtained by allowing an active-hydrogen-group-containing compound to react with MDI, polymeric MDI or a mixture of these in excess in MDI, polymeric MDI or a mixture of these in excess in equivalent weight ratio (isocyanate group/active hydrogen group). In such a prepolymer, too, the sum of the MDI or polymeric MDI may preferably account for 50% by weight or more.

The isocyanate which may be added to the organopolyisocyanate may include liquid MDI (carbodiimide-modified MDI), tolylene diisocyanate, xylylene diisocyanate, trimethylene xylylene diisocyanate, isophorone diisocyanate, hexamethylene diisocyanate, naphthalene diisocyanate, hydrogenated diphenylmethane diisocyanate, and hydrogenated xylylene diisocyanate. It may also include those part of isocyanate groups of which has been modified to biuret, an allophanate, carbodiimide, uretonimine, oxazolidone, an amide, an imide, isocyanurate or uretodione. Any of these may be used alone or in the form of a mixture of two or more types.

As the component-(A) organopolyisocyanate, a prepolymer terminated with isocyanate groups may also preferably be used which is obtained by allowing polyisocyanate to react with an active-hydrogen-group-containing compound. When the polyisocyanate is reacted with the active-hydrogen-group-containing compound, the isocyanate group and the active hydrogen group may preferably be in an equivalent weight ratio (isocyanate group/active hydrogen group) of from 2 to 500, and more preferably in the range of from 5 to 400.

The active-hydrogen-group-containing compound may preferably have a number-average molecular weight of from 32 to 10,000, and particularly preferably from 100 to 5,000. The average number of functional groups may preferably be 1 or more, and particularly preferably 1 to 4. Stated specifically, such a compound may include low-molecular weight monohydric alcohols, low-molecular weight polyols, low-molecular weight monoamines, low-molecular weight polyamines and low-molecular weight aminoalcohols, having a molecular weight less than 500, and high-molecular weight monohydric alcohols and high-molecular weight polyols, having a molecular weight of 500 or more. Any of these may be used alone or in the form of a mixture of two or more types.

The low-molecular weight monohydric alcohols may include methanol, ethanol, propanol, butanol, octanol, lauryl alcohol, ethylene glycol monobutyl ether and diethylene glycol monobutyl ether.

The low-molecular weight polyols may include ethylene glycol, diethylene glycol, triethylene glycol, 1,2-propanediol, 1,3-propanediol, dipropylene glycol, 1,2-butanediol, 1,3-butanediol, 1,4-butanediol, 1,6-hexanediol, cyclohexane-1,4-diol, cyclohexane-1,4-dimethanol, hydrogenated bisphenol A, glycerol, trimethylolpropane, pentaerythritol, sorbitol, sucrose and diglycerol.

The low-molecular weight monoamines may include ethylamine, propylamine, butylamine, diethylamine, dibutylamine, aniline and N-methylaniline.

The low-molecular weight polyamines may include tetramethylenediamine, hexamethylenediamine, tolylenediamine, 4,4'-diaminodiphenylmethane, 3,3'-dimethyl-4,4'-diaminodicyclohexylmethane, diethyltriamine, dibutyltriamine and dipropylenetriamine.

The low-molecular weight aminoalcohols may include monoethanolamine, diethanolamine, triethanolamine, N-methylethanolamine, N-methyldiethanolamine, N-ethylethanolamine, N-n-butylethanolamine, N-n-butyldiethanolamine, N-(β-aminoethyl)ethanolamine and N-(β-aminoethyl)isopropanolamine.

The high-molecular weight monohydric alcohols may include polyether monohydric alcohols obtained by subjecting any of cyclic ethers such as ethylene oxide, propylene oxide, styrene oxide and tetrahydrofuran to polyaddition, using as an initiator a compound having one active hydrogen group, such as a secondary amine, monothiol or phenol among the above low-molecular weight monohydric alcohols and low-molecular weight monoamines; and polyester monohydric alcohols obtained by subjecting any of cyclic ester monomers such as ε-caprolactam and γ-valerolactone, using as an initiator the above compound having one active hydrogen group.

The high-molecular weight polyols may include polyether polyols; hydroxyl-group-containing amine type polyethers; polyoxyethylene monoalkyl ethers; various polyester polyols obtained by the dehydration condensation reaction of dibasic acids such as adipic acid and phthalic anhydride with triols such as ethylene glycol, diethylene glycol and trimethylol propane; lactone polyols obtained by the ring-opening polymerization of cyclic ester monomers such as ε-caprolactam; polycarbonate polyols; acrylic polyols; polybutadiene polyols; phenolic polyols such as novolak resins and resol resins; and also what is called polymer polyols obtained by subjecting vinyl monomers such as acrylonitrile and styrene to radical polymerization in polyols.

In the present invention, preferred are polymeric MDI, and urethane prepolymers terminated with isocyanate groups, obtained by the reaction of polymeric MDI with hydroxyl-group-containing polyethers having a number-average molecular weight of from 100 to 5,000. This polymeric MDI is a mixture of organoisocyanate compounds having different degrees of condensation, which is obtained by converting amino groups into isocyanate groups by the phosgenation or the like of a condensation mixture (polyamine) obtained by the condensation reaction of, e.g., aniline with formalin. The polymeric MDI can be formulated in variety by changing, e.g., compositional ratios of materials and reaction conditions at the time of the condensation of aniline with formalin, and mixing ratios of various polymeric MDIs. Also, the polymeric MDI may be a reaction solution obtained after conversion into isocyanate groups, a reaction solution from which a solvent has been removed, bottoms obtained by partly separating MDI by distillation, a mixture of several types obtained under different reaction conditions and separation conditions, and also those to which MDI has been further added.

The most preferred formulations of the polymeric MDI may be a mixture containing 20 to 70% by weight of what is called a dinuclear unit (the MDI described previously), having two isocyanate groups and two benzene rings in one molecule, and 80 to 30% by weight of a polynuclear condensate having at least three isocyanate groups and at least three benzene rings in one molecule, and preferably a mixture containing 30 to 60% by weight of the dinuclear unit and 70 to 40% by weight of the polynuclear condensate.

(B) Wax Emulsion

The aim of the component-(B) wax emulsion in the present invention is to exhibit an effect as a release agent for avoiding the adhesion to the heating platen. The component-(B) wax emulsion is comprised of a wax (B1) and an emulsifier (B2). The component-(B) wax emulsion may preferably have a solid content of from 10 to 60% by weight. Also, the wax (B1) and the emulsifier (B2) may preferably be in a weight ratio of (B1)/(B2)=100/1 to 100/30, and particularly preferably (B1)/(B2)=100/5 to 100/25.

The wax (B1) may preferably have a melting point of from 40 to 100° C, and more preferably from 40 to 80° C. If the wax (B1) has a melting point below 40° C., it tends to evaporate or vaporize under conditions of 100° C. to 200° C. which are usual hot pressing temperatures, so that the wax may exhibit its releasability with difficulty. If on the other hand it has a melting point above 100° C., it may be difficult for the wax component to move to the formed-article surface upon heating because even under conditions of a hot pressing temperature of 200° C. the internal temperature of the formed article does not necessarily rise to that temperature within the time of forming, so that the wax can not exhibit its releasability from the heating platen. Also, it may be difficult to obtain a stable wax emulsion.

The wax (B1) may preferably have a molecular weight in the range of from 100 to 1,200 in its molecular weight distribution measured by gel permeation chromatography (hereinafter "GPC") and as molecular weight in terms of polyoxypropylene glycol (hereinafter "PPG") as a reference substance. If components having a molecular weight less than 100 are in a large quantity in the wax (B1), the wax tends to evaporate or vaporize under conditions of 100° C. to 200° C. which are usual hot pressing temperatures, so that the wax may exhibit its releasability with difficulty. Also, if components having a molecular weight more than 1,200 are in a large quantity, the component-(B) wax emulsion may have a poor stability and also a low compatibility with the component-(A) organopolyisocyanate, and the wax has a relatively higher melting point. Hence, it may be difficult for the wax component to move to the formed-article surface upon heating, so that the wax can not exhibit its releasability from the heating platen. Also, the wax may more preferably have a number-average molecular weight of from 300 to 700 for the same reasons as the above reasons.

The wax may still more preferably have at least 70%, as peak area percentage, of a component having a molecular weight of from 200 to 1,000, because such a wax has especially good releasability and stability.

The wax component may also preferably contain at least 80% of a paraffin having 20 to 40 carbon atoms, and in the paraffin the straight-chain aliphatic hydrocarbon may preferably be in a proportion of at least 90%.

The emulsifier (B2) used to emulsify the above wax is an ethylene oxide polyaddition product of an aliphatic monoalcohol whose aliphatic chain has 14 to 20 carbon atoms, having a number-average molecular weight of from 250 to 3,000. If it has a number-average molecular weight more than 3,000, it may have a low compatibility with the wax, and hence not only the component-(B) wax emulsion may have a low liquid stability, but also the wax emulsion has a high melting point, so that it may be difficult for the release agent to move to the formed-article surface at the time of hot-press forming, resulting in a poor releasability from the heating platen.

In the present invention, the ethylene oxide polyaddition product of an aliphatic monoalcohol whose aliphatic chain has 14 to 20 carbon atoms, having a number-average molecular weight of from 250 to 3,000, is used as the emulsifier (B2). This is because it has been found that such a product is greatly effective as a surface-active agent in emulsifying the wax and also can be effective for releasability. More specifically, the aliphatic hydrocarbon structure whose aliphatic chain has 14 to 20 carbon atoms is effective not only for the compatibility with the wax (B1) but also for the improvement in the releasability from the heating platen, and on the other hand the polyoxyethylene structure is effective for the improvement in hydrophilic properties, thus the component-(B) wax emulsion can be made up in a good liquid stability.

The aliphatic monoalcohol whose aliphatic chain has 14 to 20 carbon atoms may include myristyl alcohol (tetradecanol), pentadecanol, cetyl alcohol (hexadecanol), heptadecanol, stearyl alcohol (octadecanol), nonadecanol, and isomers of these. Any of these may be used alone or in the form of a mixture of two or more types.

The emulsifier (B2) can be obtained by addition-polymerizing ethylene oxide with the aliphatic monoalcohol whose aliphatic chain has 14 to 20 carbon atoms, or a mixture thereof, by a known process.

Besides, other emulsifiers may optionally be used, as exemplified by compounds such as polyoxyalkylene alkyl ethers, polyoxyalkylene alkylallyl ethers, polyoxyalkylene alkyl esters, polyoxyalkylene alkyl amines, polyoxyalkylene phenyl ethers, polyoxyalkylene alkyl ether sulfonates, polyoxyalkylene phenyl ether sulfonates, alkylene disulfonates, dialkyl succinate sulfonates, alkylbenzenesulfonates and dialkylallyl sulfonates.

Optional Components

In addition to the above components (A) and (B), the adhesive composition of the present invention may further contain as component (C) a formalin condensation resin.

As the component-(C) formalin condensation resin, any of urea resin, melamine resin, urea-melamine co-condensation resin, phenol resin, phenol-melamine cocondensation resin may be mixed and used. In the present invention, taking account of environmental factors, it is preferable to use in combination with the component (C) a low-formalin type resin (a resin whose molar ratio of formalin/other material compounds is 1.0 to 1.1 at the time of condensation) or a formalin catcher such as urea or ammonia. The mixing ratio of the component (C) to the component (A) may preferably be component (A)/component (C)=5/95 to 95/5, and particularly preferably 10/90 to 90/10, as weight ratio in terms of solid content.

In the present invention, for the purpose of controlling physical properties of hot-pressed forms to be obtained, an active-hydrogen-group-containing compound may be used in combination. Such an active-hydrogen-group-containing compound may include those used to obtain the prepolymer terminated with isocyanate groups as described previously.

The active-hydrogen-group-containing compound may further include polyoxyalkylene polyamines having an oxyalkylene structure in the molecule, specifically including, e.g., as polyoxypropylene diamine, JEFFAMINE D-2000 (Huntsman Speciality Chemicals Corp.; amine equivalent weight: about 1,000); and as polyoxypropylene triamine, TECKSLIM TR-5050 (Huntsman Speciality Chemicals Corp.; amine equivalent weight: about 1,930) and JEFFERMINE T-430 (Huntsman Speciality Chemicals Corp.; amine equivalent weight: about 160).

In the present invention, a known catalyst as shown below may be used. This catalyst also functions as a catalyst for accelerating the curing reaction of the component (A) with the component (B) and lignocellulose materials.

Specific examples of a tertiary amine type catalyst may include catalysts such as triethylamine, triethylenediamine, N-methylformalin, N-methylimidazole, 1-methylimidazole, 1-ethylimidazole, 1-propylimidazole, 1-cyanoimidazole, 1-cyanomethylimidazole, 1,2-dimethylimidazole, 1,4-dimethylimidazole, 1-methyl-2-ethylimidazole, 1-methyl-4-ethylimidazole, 1-ethyl-2-methylimidazole, 1-ethyl-4-methylimidazole, pyridine, and α-picoline.

As amine type catalysts having active hydrogen capable of reacting with the polyisocyanate composition, also usable are monoethanolamine, diethanolamine, triethanolamine, N,N,N'-trimethylaminoethylethanolamine, and N,N,N',N'-tetramethylhydroxypropylenediamine.

Specific examples of a metal type catalyst may include dibutyltin dilaurate, dioctyltin dilaurate, calcium naphthate, potassium octylate, tin octylate, and zinc octylate.

The above catalyst component may preferably be added in an amount of from 0.1 to 20% by weight based on the weight of the component (A). The addition in an amount less than the above lower limit may make the curing reaction insufficient, tending to make it difficult to obtain hot-pressed forms having the intended physical properties. On the other hand, the addition in an amount more than the above upper limit may make the curing reaction so fast as to cause the lignocellulose material to react and solidify before it is hot-pressed with the heating platen, so that any normal hot-pressed form can not be obtained.

In the adhesive composition of the present invention, an inorganic filler such as cement, blast furnace slag, gypsum, calcium carbonate, clay, aluminum hydroxide, antimony trioxide, quick lime (calcium oxide), slaked lime (calcium hydroxide) or bentonite, a leveling agent, a flame retardant, an age resistor, a heat-resistance-providing agent, an antioxidant and so forth may optionally be mixed under appropriate control of mixing quantity.

Hot-pressed Forms Production Process

A process for producing lignocellulose-type hot-pressed forms is subsequently described below.

The lignocellulose-type hot-pressed forms are obtained by coating a lignocellulose material with the adhesive composition described above, followed by compression with heating.

The lignocellulose-type hot-pressed forms obtained by the present invention may include particle boards, oriented strand boards (OSB), wafer boards, laminated veneer lumbers (LVL), laminated strand lumbers (LSL), parallel strand lumbers (PSL), hard boards, medium-density fiber boards (MDF) and insulation boards.

The lignocellulose material used in the present invention may include wood chips such as strand chips, dust chips and flake chips, kaoliang stems, bagasse, rice hulls, hemp, straw, rush, reed, coconuts or coconut palms, rubber plants, corn stems, and sawdust or fibers made from these materials. Any of these may be used alone or in combination of two or more types.

The adhesive composition may be mixed in the lignocellulose material in a proportion (weight ratio in terms of solid content) of lignocellulose material:organopolyisocyanate: wax emulsion=100:5 to 20:0.5 to 10.

First, the lignocellulose material is coated with the adhesive composition described above. As a method for this coating, the component-(A) organopolyisocyanate, the component-(B) wax emulsion, the component-(C) formalin condensation resin and optionally the catalyst and so forth may be used by mixing them immediately before the above lignocellulose materials of various types are coated, or the lignocellulose materials may separately be coated with the respective components when used. Here, a mixture system to which water has been added may be used.

When produced on a continuous line, a preliminary mixture prepared by previously mixing the components other than the component-(A) organopolyisocyanate is continuously mixed with the component-(A) organopolyisocyanate by means of a static mixer and then a lignocellulose material is coated with the resultant mixture (adhesive composition). Thereafter, the lignocellulose material having been coated with the adhesive composition is shaped into a board on a heating platen, followed by hot pressing. This hot pressing may be carried out under any conventionally known forming conditions, all of which may be used. Preferable conditions for the hot pressing are a temperature of from 100 to 250° C., a pressure of from 1 to 10 MPa, and a time (per thickness of 1 mm) of from 6 to 30 seconds, and also particularly preferably a temperature of from 150 to 230° C., a pressure of from 2 to 5 MPa, and a time (per thickness of 1 mm) of from 6 to 25 seconds.

As described above, the adhesive composition of the present invention, or the process for producing hot-pressed forms by using the same, makes it able not only to prevent formed articles from adhering to the heating platen surface but also to obtain hot-pressed forms of lignocellulose materials which are superior in physical properties, too.

EXAMPLES

The adhesive composition for lignocellulose-type hot-pressed forms according to the present invention and the production process making use of the same are described below in greater detail by giving Examples. The present invention is by no means limited to these Examples.

Synthesis Examples 1 to 5

Synthesis of Solutions A

Into a reactor of 2,000 ml in volume, having a stirrer, a thermometer, a condenser and a nitrogen gas feed pipe, materials shown in Table 1 were charged in quantities also shown therein. Thereafter, the materials charged were heated to 80° C. to react for 3 hours, synthesizing organopolyisocyanates A1 to A5. The results of synthesis are also shown in Table 1.

Solutions-A Synthesizing Materials

PDM I-1: Polymeric MDI.
  Isocyanate content: 31.1%.
  MDI content in polymeric MDI: 42%.
  4,4'-MDI in polymeric MDI: 99%.
PDM I-2: Polymeric MDI.
  Isocyanate content: 30.1%.
  MDI content in polymeric MDI: 30%.
  4,4'-MDI in polymeric MDI: 100%.
PPG-200: Poly(oxypropylene) polyol.
  Number-average molecular weight: 200.
  Average number of functional groups: 2.
PEG-2000: Poly(oxyethylene) polyol.
  Number-average molecular weight: 2,000.
  Average number of functional groups: 2.
MPEG-700: Methoxypolyethylene glycol.
  Number-average molecular weight: 700.
  Average number of functional groups: 1.

Examples 1 to 4 & Comparative Examples 1 to 4

Preparation of Adhesive Compositions

The above organopolyisocyanates A1 to A5 as shown in Table 1 and the wax emulsions and so forth shown below were combined to prepare adhesive compositions for lignocellulose-type hot-pressed forms. The formulation of each adhesive composition and the results of evaluation are shown in Table 2.

In Comparative Example, since any external release agent for imparting releasability was not used, the adhesion of the formed article to the heating platen was so strong that the physical properties could not be evaluated.

Component (B)

Wax emulsion P: (solid content: 30%)
  Details are:
Wax (B1): Paraffin wax containing paraffin having 20 to 39 carbon atoms.
  Straight-chain aliphatic hydrocarbon content: 95% or more.
  Range of molecular weight distribution: 250 to 900.
  Number-average molecular weight: 450.
  Peak area percentage of component having molecular weight of from 200 to 1,000: 100%.
  Melting point: 54° C.
Emulsion (B2):
  Ethylene oxide polyaddition product of stearyl alcohol.
  Number-average molecular weight: 650.
(B1):(B2) =100:15 (weight ratio).
Wax emulsion Q: (solid content: 30%)
  Details are:
Wax (B1): Paraffin wax containing paraffin having 22 to 33 carbon atoms.
  Straight-chain aliphatic hydrocarbon content: 95% or more.
  Range of molecular weight distribution: 300 to 800.
  Number-average molecular weight: 350.
  Peak area percentage of component having molecular weight of from 200 to 1,000: 100%.
  Melting point: 58° C.
Emulsion (B2):
  Ethylene oxide polyaddition product of stearyl alcohol.
  Number-average molecular weight: 1,100.
(B1):(B2) =100:20 (weight ratio).

Wax emulsion R: (solid content: 30%)
  Details are:
Wax (B1): Montanic acid wax.
  Range of molecular weight distribution: 3,000 to 12,000.
  Number-average molecular weight: 8,500
  Peak area percentage of component having molecular weight of from 200 to 1,000: 0%.
  Melting point: 65° C.
Emulsion (B2):
  Sodium polyoxyethylene alkyl ether sulfonate.
  Number-average molecular weight: 4,500.
(B1):(B2)=100:15 (weight ratio).

Here, the straight-chain aliphatic hydrocarbon contents in the wax emulsions P and Q were calculated from NMR data. Also, the data of the respective molecular weights in the wax emulsions P, Q and R were obtained by GPC in terms of PPG.

Component (C)

Resin M: Urea-melamine co-condensation resin (molar ratio: 1.05; solid content: 50%).

Catalyst

Catalyst S: Dipropylene glycol solution of triethylenediamine (solid content: 33%).

Forming of Hot-pressed Forms of Lignocellulose Material (1) Forming conditions:
  Board size: 40 cm×40 cm.
  Board thickness: 15 mm.
  Preset density: 0.720 g/cm$^3$.
  Water content and kind of tree of wood chips or wood fibers: 3%, needle-leaf tree.
  Product water content: 9%.
  Mat water content: 9%.
  Heating platen (press) temperature: 160° C.
  Heating platen (press) pressure: 30 kg/cm$^2$ (face pressure).
  Heating platen (press) heating time: 150 seconds.
(2) Forming method:
  With regard to the production of the hot-pressed forms shown in Table 2, particle boards (Examples 1 and 2 and Comparative Examples 1 and 2) obtained using wood chips were produced by the following method (a), and medium-density fiber boards (Examples 3 and 4 and Comparative Examples 3 and 4) obtained using wood fibers were produced by the following method (b).
  (a) Method for making hot-pressed forms in Examples 1 and 2 and Comparative Examples 1 and 2:
    Needle-leaf tree wood chips used in the quantity shown in Table 2 were introduced into a blender of about 0.5 m$^3$ in volume, having an agitating blade, which wood chips were then spray-coated with a mixture of the organopolyisocyanate compound, wax emulsion, amine catalyst and water for mat water content which were used in the quantities shown in Table 2. Thereafter, the wood chips thus coated with the adhesive composition were taken out and so weighed that the hot-pressed form after forming come to have the preset density, and then so shaped on the following iron plate as to come to have the board size shown above. An iron plate having the same shape was further placed on the shaped material, followed by hot-press forming under the conditions shown above.
  (b) Method of making hot-pressed forms of Examples 3 and 4 and Comparative Examples 3 and 4:
    Needle-leaf tree wood chips used in the quantity shown in Table 2 were splitted into fibers (or fiberized) by means of a pressure refiner under conditions of a digesting pressure of 0.7 MPa and a digesting temperature of 120° C. The resultant fibers were passed through a pipe, where a mixture of the organopolyisocyanate compound, wax emulsion, amine catalyst and water for mat water content which were used in the quantities shown in Table 2 was sprayed thereon. Thereafter, the wood fibers thus sprayed were successively passed through the pipe so as to be dried until they have the mat water content shown above. Then, the wood fibers thus coated with the adhesive composition were taken out and so weighed that the hot-pressed form after forming come to have the preset density, and then so shaped on the following iron plate by means of a shaping assembly, as to come to have the board size shown above. An iron plate having the same shape was further placed on the shaped material, followed by hot-press forming under the conditions shown above.

Releasability Check

Iron plates (SPCC-SB) available from Japan Test Panel Co. were placed on the top and bottom of the board, and the releasability was checked at the time of the above forming.

Measurement of Physical Properties

Values of the various physical properties shown in Table 2 were measured according to JIS A5908 in respect of the hot-pressed forms in Examples 1 and 2 and Comparative Examples 1 and 2, and according to JIS A5905 in respect of the hot-pressed forms of Examples 3 and 4 and Comparative Examples 3 and 4.

As can be seen from Table 2, the lignocellulose material hot-pressed forms obtained using the adhesive composition of the present invention showed good physical properties and productivity. In Comparative Examples, however, the products were obtainable in a low productivity and also the lignocellulose material hot-pressed forms obtained showed inferior physical properties.

TABLE 1

|  | Synthesis Example | | | | |
| --- | --- | --- | --- | --- | --- |
|  | 1 | 2 | 3 | 4 | 5 |
| Solution A: | A1 | A2 | A3 | A4 | A5 |
| Polyisocyanate: (kg) | | | | | |
| PMDI-1 | 1,000 | 980 | 950 | 970 | |
| PMDI-2 | | | | | 1,000 |
| Polyol: (kg) | | | | | |
| PPG-200 | | 20 | | | |
| PEG-2000 | | | 50 | | |
| MPEG-700 | | | | 30 | |
| NCO content: (%) | 31.1 | 29.6 | 29.3 | 30.0 | 30.1 |
| Voscosity at 25° C.: (mPa · s) | 180 | 260 | 320 | 180 | 500 |

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| Solution A: (kg) | | | | | | | | |
| A1 | 10 | | | | 10 | | | |
| A2 | | 10 | | | | | | |
| A3 | | | 12 | | | | | |
| A4 | | | | 12 | | | 12 | 12 |
| A5 | | | | | | 10 | | |
| Solution B: (kg) | | | | | | | | |
| P | | | 1.2 | 1.2 | | | | |
| Q | 1.0 | 1.0 | | | | | | |
| R | | | | | | 1.0 | 1.2 | 1.2 |
| Solution C: (kg) | | | | | | | | |
| M | | | | 1.0 | | | | |
| Catalyst: (kg) | | | | | | | | |
| S | 1.0 | | 1.0 | | 1.0 | 1.0 | 1.0 | |
| Lignocellulose material: (kg) | | | | | | | | |
| Wood ships | 100 | 100 | | | 100 | 100 | | |
| Wood fibers | | | 100 | 100 | | | 100 | 100 |
| Normal flexural strength: (N/mm$^2$) | 39 | 37 | 41 | 40 | * | 24 | 14 | 5 |
| Wet flexural strength: (N/mm$^2$) | 22 | 21 | 24 | 23 | * | 10 | 5.0 | 2.3 |
| Peel strength: (N/mm$^2$) | 1.1 | 1.2 | 1.3 | 1.2 | * | 0.5 | 0.4 | 0.1 |
| Water pickup thickness expansivity: (%) | 3.5 | 4.1 | 4.2 | 4.0 | * | 11 | 8.8 | 17 |
| Releasability: | A | A | A | A | C | B | B | B |

(Remarks)
A: good, B: slightly poor, C: poor
*The formed article adhered too strongly to the heating platen and evaluation was not able to be made on the physical properties.

What is claimed is:

1. A lignocellulosic material-containing composition comprising:

an organopolyisocyanate which is a polyisocyanate composed chiefly of from 20% by weight to 70% by weight of a diphenylmethane diisocyanate having two benzene rings in one molecule and from 80% by weight to 30% by weight of a diphenylmethane diisocyanate polynuclear condensate having at least three benzene rings in one molecule, and has a viscosity of 500 mPa·s or less in the state of solid content=100% by weight at 25° C.;

a wax emulsion prepared by emulsifying a wax which is a paraffin wax containing at least 80% by weight of a paraffin having 20 to 40 carbon atoms, and has a melting point of from 40° C. to 100° C., with an emulsifier which is an ethylene oxide polyaddition product of an aliphatic monoalcohol whose aliphatic chain has 14 to 20 carbon atoms; and a lignocellulosic material.

2. The composition according to claim 1, wherein said paraffin wax has a molecular weight of from 100 to 1,200 in its molecular weight distribution measured by gel permeation chromatography and as molecular weight in terms of polyoxypropylene glycol as a reference substance.

3. The composition according to claim 1, wherein said emulsifier has a number-average molecular weight of from 250 to 3,000.

4. The composition according to claim 2, wherein said emulsifier has a number-average molecular weight of from 250 to 3,000.

5. The composition according to claim 1, which further comprises a formalin condensation resin.

6. The composition according to claim 2, which further comprises a formalin condensation resin.

7. The composition according to claim 3, which further comprises a formalin condensation resin.

8. The composition according to claim 4, which further comprises a formalin condensation resin.

9. A hot-pressed form comprising the composition of claim 1.

* * * * *